Figure 1:
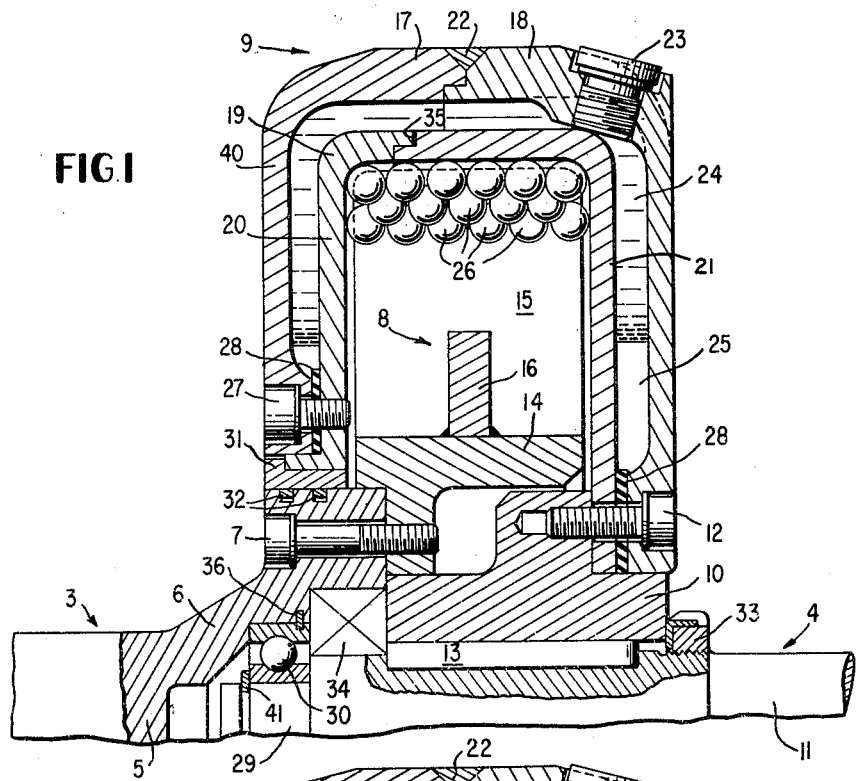

June 22, 1965  M. H. BURCKHARDT  3,190,422
CENTRIFUGAL CLUTCH WITH VIBRATION DAMPER
Filed April 7, 1961

INVENTOR
MANFRED H. BURCKHARDT
BY Dickey, Craig & Freudenberg
ATTORNEYS

United States Patent Office 3,190,422
Patented June 22, 1965

3,190,422
CENTRIFUGAL CLUTCH WITH VIBRATION DAMPER
Manfred H. Burckhardt, Waiblingen, Germany, assignor to Daimler-Benz Aktiengesellschaft, Stuttgart-Unterturkheim, Germany
Filed Apr. 7, 1961, Ser. No. 101,578
5 Claims. (Cl. 192—105)

The present invention relates to a centrifugally actuated friction clutch, especially for motor vehicles, provided with chambers formed by entrainment disks between a driving clutch part and a driven clutch part surrounding the same, whereby globular material, for example, spherically-shaped bodies are arranged between the two clutch halves within the chambers.

Friction clutches of the type mentioned hereinabove are known, per se, in the prior art. In these prior art clutch constructions, the spherically-shaped members are set into rotation by a driving entrainment wheel and are pressed force-lockingly against the cylindrical inside of the driven clutch part by the resulting centrifugal force.

These known clutch constructions of the prior art, however, have the disadvantage that they are unpleasantly and annoyingly noisy during operation thereof. The ball-shaped bodies are circulated and rotated in the circumferential direction by the driving entrainment wheel. With a change in the driving rotary speed, the ball-shaped bodies are slidingly displaced with respect to each other and also with respect to the entrainment wheel as well as possibly also with respect to the side walls forming the chambers in the axial direction. The ball-shaped bodies roll along the inside of the cylindrically-shaped outer casing of the driven clutch part with the slippage characteristic of the clutch at constant rotational speed. This means in practice that the clutch known in the prior art operates with such a noise in case of a change in the driving rotary speed, for example, during starting and accelerations, which, with the driving comfort expected today, is unacceptable to the passenger.

The present invention is concerned with the aim and purpose to eliminate the aforementioned disadvantage. The underlying problem is solved in accordance with the present invention by constructing the driven clutch part as a double-walled housing provided with a hollow space disposed therebetween. The construction of the housing in accordance with the present invention offers the advantage that during operation the noise of the clutch, properly speaking, is damped and therewith is no longer unpleasantly noticeable to the driver.

The heat that occurs as a result of the friction work in the clutch is transmitted in accordance with the present invention to the outer wall of the driven clutch part by the fact that the hollow space available by the double-walled construction is filled partly with a liquid, for example, oil. With a partial filling of the hollow space, there is assured, in addition to a good heat conduction, also a sound absorption since the vibrations occurring along the inner housing wall are not transmitted by the liquid to the outer housing wall but are absorbed within the liquid by change in the liquid level.

Since the inner housing wall has, as the abutment surface of the clutch members, a higher temperature than the outer housing wall and is increasingly heated in the direction radially outwardly, there is achieved in accordance with the present invention a convection, i.e., a heat transfer with free flow.

The same effect, i.e., sound absorption and good heat transfer may also be achieved by filling the hollow space available by the double-walled construction with a porous heat conducting filler material, for example, steel wool. Additionally, according to the present invention, the hollow space available by the double-walled construction may also be filled completely or partly with a gaseous medium, for example, with an organic vapor.

The hollow space within the double-walled housing may be so constructed that the driven double-walled housing consists of an outer drum-shaped housing and of a smaller inner drum-shaped housing whereby each drum-shaped housing itself is formed by two housing-shells arranged axially with respect to each other. These two drum-shaped housings may be made of different material; for example, the inner drum-shaped housing may be advantageously made of steel having a surface-hardened inside or inner surface and the outer drum-shaped housing of a material having good heat-conducting characteristics, for example, of copper, brass or aluminum.

However, according to a modified construction in accordance with the present invention, the hollow space may also be cast into the driven clutch part in any suitable manner. In that case, the double-walled housing consists of two housing-shells arranged axially with respect to each other. In order to dampen the vibrations that occur during operation of the clutch either at the inner smaller drum-shaped housing or, with a cast-in hollow space, at the double-walled housing shells, along the connecting places of the inner with the outer drum-shaped housing or of the housing shells with the driven part, the connecting places may be provided with a noise absorbing or vibration absorbing intermediate part or member.

Accordingly, it is an object of the present invention to provide a centrifugally actuated clutch of the type mentioned hereinabove which eliminates the drawbacks and shortcomings of the prior art constructions in a simple and effective manner.

It is another object of the present invention to provide a centrifugally actuated clutch utilizing globular bodies to effect clutching engagement in which the noise produced especially during changes in the speed of the driving part of the clutch are effectively eliminated or at least reduced to a level where they no longer are noticeable in an annoying manner.

Still another object of the present invention resides in the provision of a centrifugally actuated clutch utilizing globular clutch material in which vibrations and noises are effectively damped and which also offers extremely favorable characteristics as regards absorption of heat produced within the clutch.

Figure 2:
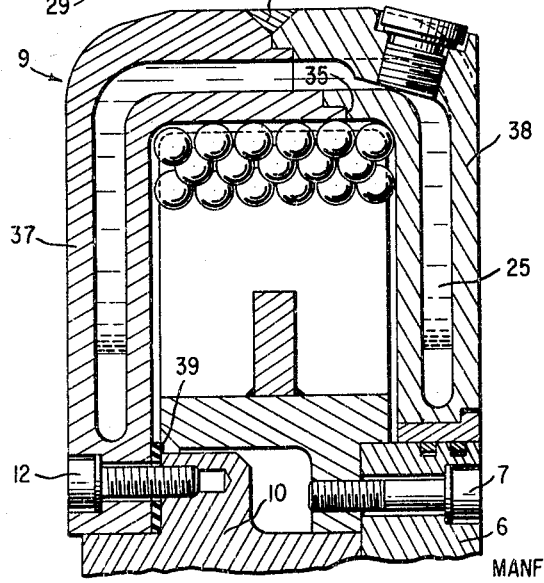

These and other objects, features and advantages of the present invention will become more obvious from the following description when taken in connection with the accompanying drawing which shows, for purposes of illustration only, two embodiments in accordance with the present invention, and wherein:

FIGURE 1 is a partial axial longitudinal cross sectional view through a first embodiment of a friction clutch in accordance with the present invention showing the parts thereof in the engaged position of the clutch, and FIGURE 2 is a partial axial longitudinal cross sectional view through a modified embodiment of a friction clutch in accordance with the present invention, again illustrating the parts thereof in the engaged position of the clutch.

Referring now to the drawing wherein like reference numerals are used throughout the two views to designate corresponding parts, and more particularly to FIGURE 1, the centrifugally actuated friction clutch in accordance with the present invention essentially consists of a driving part or input means generally designated by reference number 3 and a driven part or output means generally designated by reference numeral 4. The drive or transmission of torque takes place in the clutch through the drive shaft 5, the driving web portion 6 and the entrainment wheel generally designated by reference numeral 8 connected therewith by means of the threaded connection 7, for example, by means of bolt members or the like. The driven part generally designated by reference numeral 4 consists of a double-walled clutch part generally designated by reference numeral 9, a flange portion 10 and the driven shaft 11. The double-walled clutch part 9 is operatively connected by means of the threaded connection 12, for example, by means of bolt members 12 with the flange portion 10 and the flange portion 10 with the driven shaft 11 by any suitable means, for instance, a spline connection 13 assuring common rotation of the parts. The flange portion 10 is fixed by abutment thereof at the driving web portion 6 and axially fixed on the driven shaft 11 by the threaded connection 33 which may be a safety threaded connection to prevent accidental unloosening thereof. The entrainment wheel generally designated by reference numeral 8 consists of a ring or annular member 14 along the circumference of which are radially secured several entrainment disks 15 by means of support bracket 16.

The driven double-walled clutch part 9 consists of an outer drum-shaped housing 40 which in turn consists of two housing shells 17 and 18 axially directed with respect to each other and of a smaller inner drum-shaped housing 19 which again consists of two housing shells 20 and 21 axially directed with respect to each other. The double-walled clutch part 9, upon assembly of the entrainment wheel 8, is welded, brazed or soldered together at the outer circumference thereof along the separating joint 22. The inner housing shells 20 and 21 may also be welded together along the separating gap 35. However, the housing shells 20 and 21 may also be joined only loosely or detachably in a fluid-tight manner so that the medium present within the hollow space 25 cannot escape. The noise damping fluid 24, for example, oil, is filled into the hollow space 25 through the feed pipe or nipple 23.

Ball members 26 serve as clutch members. The balls 26 abut, during the clutching operation, against the cylindrical inside of the double-walled driven clutch part 9 and transmit the occurring friction moment. The connection of the two drum-shaped housings 19 and 40 takes place by means of threaded connections 27 and 12. A noise or vibration absorbing intermediate sealing member 28 is inserted at these two threaded connecting places. The double-walled clutch part 9 is connected by the threaded connection 12 with the flange portion 10 of the output. Additionally, the double-walled housing part 9 is supported on the driving web portion 6 by means of the bearing dish 31, made of any suitable bearing material. The driven shaft 11 is supported with the extension 29 thereof within roller bearing 30 with respect to the driving shaft 5 and is also axially fixed by the securing means 41 and 36 with respect thereto. Two sealing rings 32 are placed into the driving web portion 6. The driving part 3 of the clutch is operatively connected through a free-wheeling device 34 of any suitable construction with the driven part 4. The free-wheeling device 34 thereby prevents a faster rotation of the part 4 with respect to the part 3 when the vehicle drives the engine.

FIGURE 2, which is similar to FIGURE 1, shows a double-walled clutch part 9 provided with a cast-in hollow space 25 which is formed by two axially directed double-walled housing shells 37 and 38. Both of these housing shells 37 and 38 are connected with each other at the outer periphery thereof along the separating joint 22 as in FIGURE 1. Both housing shells 37 and 38 are also detachably or loosely joined again in a fluid-tight manner along the separating joint 35. The clutch part 9 is again connected with the flange portion 10 through the bolted connection 12. The drive takes place in this embodiment through the driving web portion 6 and the bolted connection 7. The vibration absorbing intermediate sealing member 39 is inserted in this embodiment at the bolted connection 12 between the double-walled housing part 9 and the flange portion 10.

While I have shown and described two embodiments in accordance with the present invention, it is understood that the same is not limited thereto but is susceptible of many changes and modifications within the spirit and scope thereof. For example, the size and material for the clutch members 26 which are preferably of globular shape may be chosen to suit the particular needs and requirements of the clutch. Additionally, the particular fluid medium or media present within the hollow space may also be selected to satisfy the particular requirements of the clutch.

Thus, it is obvious that the present invention is susceptible of many changes and modifications within the spirit and scope thereof and I, therefore, do not wish to be limited to the details shown and described herein but intend to cover all such changes and modifications as are encompassed by the scope of the appended claims.

I claim:

1. A centrifugally operated friction clutch, especially for motor vehicles, comprising
driving clutch means,
driven clutch means surrounding said driving clutch means,
said driving clutch means comprising a drive shaft and entrainment means secured to said drive shaft and including a ring member and at least one radially secured entrainment disk connected to said ring member, said entrainment disk together with said ring member effectively providing chambers disposed between said driving and driven clutch means,
and operating means operative to provide a force-locking engagement between said driving and said driven clutch means during the occurrence of a centrifugal force acting on said operating means, said operating means consisting of a plurality of essentially globular clutch bodies within said chambers,
said driven clutch means comprising a driven shaft and a double-walled housing secured thereto and enclosing said driving clutch means, said housing consisting of an outer drum-shaped housing part, an inner drum-shaped housing part nested within and spaced from said outer drum-shaped housing part, and vibration damping and sealing means connecting said housing parts together to form a sealed hollow space therebetween, and a sound-absorbing material arranged in said hollow space.

2. A centrifugally operated friction clutch, especially for motor vehicles, comprising
driving clutch means,
driven clutch means surrounding said driving clutch means,
said driving clutch means comprising a driven shaft and entrainment means secured to said drive shaft and including a ring member and at least one radially secured entrainment disk connected to said ring member, said entrainment disk together with said ring member effectively providing chambers disposed between said driving and driven clutch means,
and operating means operative to provide a force-locking engagement between said driving and said driven clutch means during the occurrence of a centrifugal force acting on said operating means, said operating means consisting of a plurality of essentially globular clutch bodies disposed within said chambers,
said driving clutch means comprising a drive shaft and a double-walled housing secured thereto and enclosing said driving clutch means, said housing consisting of an outer drum-shaped housing part, and inner drum-shaped housing part, each of said housing parts being composed of two housing shells disposed axially with respect to each other and joined with each other in a fluid-tight manner, and vibration damping and sealing means connecting said housing parts together to form a sealed hollow space therebetween, and a sound-absorbing medium arranged within said hollow space.

3. A centrifugally operated friction clutch, especially for motor vehicles comprising:

driving clutch means, driven clutch means surrounding said driving clutch means, said driving clutch means comprising a drive shaft and entrainment means secured to said drive shaft and including a ring member and at least one radially secured entrainment disk connected to said ring member, said entrainment disk together with said ring member effectively providing chambers disposed between said driving and driven clutch means, said operating means being operative to provide a force-locking engagement between said driving and said driven clutch means during the occurrence of a centrifugal force acting on said operating means, said operating means consisting of a plurality of essentially globular clutch bodies within said chambers.

said driven clutch means comprising a driven shaft and a double-walled housing secured thereto and enclosing said driving clutch means, said double-walled housing consisting of an outer drum-shaped housing part and an inner drum-shaped housing part nested within and spaced from said outer drum-shaped housing part so as to define a hollow space therebetween, a sound-absorbing material arranged in said hollow space, said driven clutch means further including vibration-damping and sealing means whereby vibration is substantially reduced and sealing is provided between said double-walled housing part and said driven shaft.

4. A centrifugally operated friction clutch, especially for motor vehicles comprising:

driving clutch means, driven clutch means surrounding said driving clutch means, said driving clutch means comprising a drive shaft and entrainment means secured to said drive shaft and including a ring member and at least one radially secured entrainment disk connected to said ring member, said entrainment disk together with said ring member effectively providing chambers disposed between said driving and driven clutch means, and operating means operative to provide a force-locking engagement between said driving and said driven clutch means during the occurrence of a centrifugal force acting on said operating means, said operating means consisting of a plurality of essentially globular clutch bodies within said chambers, said driven clutch means comprising a driven shaft and a double-walled housing secured thereto and enclosing said driving clutch means, said housing consisting of two double-walled housing shells disposed axially with respect to each other, each of said double-walled housing shells comprising a portions of minimum radius and an inner and outer drum-shaped housing part, said inner housing part being axially nested within and spaced from said outer housing part so as to define a hollow space therebetween, said inner and outer drum-shaped housing parts being integral with said portion of minimum radius, a sound-absorbing material arranged in said hollow space, and vibration-damping and sealing means disposed between said driven shaft and said double-walled housing.

5. A centrifugally operated friction clutch, especially for motor vehicles, comprising:

driving clutch means, driven clutch means surrounding said driving clutch means, said driving clutch means comprising a drive shaft and entrainment means secured to said drive shaft and including a ring member and at least one radially secured entrainment disk connected to said ring member, said entrainment disk together with said ring member effectively providing chambers disposed between said driving and driven clutch means, and operating means operative to provide a force-locking engagement between said driving and said driven clutch means during the occurrence of a centrifugal force acting on said operating means, said operating means consisting of a plurality of essentially globular clutch bodies disposed within said chambers, said driven clutch means comprising a driven shaft and a double-walled housing secured thereto and enclosing said driving clutch means, said housing consisting of an outer drum-shaped housing part, an inner drum-shaped housing part nested within and spaced from said outer drum-shaped housing part, each of said housing parts being composed of two housing shells disposed axially with respect to each other and including respective, mutually facing wall portions, vibration-damping and sealing means connecting said housing parts together to form a sealed hollow space therebetween, and a sound-absorbing medium arranged within said hollow space.

References Cited by the Examiner

UNITED STATES PATENTS

| 1,440,161 | 12/22 | Lippincott | 192—113 |
| 1,848,616 | 3/32 | Fottinger | 192—105 |
| 1,859,963 | 5/32 | Futscher | 192—105 |
| 1,910,270 | 5/33 | Whiteside | 192—58 |
| 2,065,601 | 12/36 | Meyer | 192—68 |
| 2,719,620 | 10/55 | McDonald | 192—113 |
| 2,869,700 | 1/59 | Bowden | 192—67 |
| 2,910,160 | 10/59 | Meder | 192—105 |
| 2,991,851 | 7/61 | Alden | 188—264 |

DAVID J. WILLIAMOWSKY, *Primary Examiner.*

THOMAS J. HICKEY, *Examiner.*